United States Patent [19]
Beller et al.

[11] Patent Number: 5,602,377
[45] Date of Patent: Feb. 11, 1997

[54] BAR CODE DATAFORM SCANNING AND LABELING APPARATUS AND METHOD

[75] Inventors: William E. Beller, Akron, Ohio; Ynjiun P. Wang, Fort Myers, Fla.

[73] Assignee: Metanetics Corporation, Fort Meyers, Fla.

[21] Appl. No.: 396,519

[22] Filed: Mar. 1, 1995

[51] Int. Cl.⁶ .................................................. G06K 7/10
[52] U.S. Cl. ........................ 235/462; 235/432; 235/385; 235/472
[58] Field of Search .................................. 235/432, 385, 235/462, 472

[56] References Cited

U.S. PATENT DOCUMENTS

| | | |
|---|---|---|
| D. 309,295 | 7/1990 | da la Huerga et al. . |
| 4,377,741 | 3/1983 | Brekka et al. ........................ 235/472 |
| 4,387,297 | 6/1983 | Swartz et al. . |
| 4,440,248 | 4/1984 | Teraoka ............................. 235/462 X |
| 4,460,120 | 7/1984 | Shepard et al. . |
| 4,593,186 | 6/1986 | Swartz et al. . |
| 4,652,317 | 3/1987 | Seestrom ................................. 156/64 |
| 4,660,221 | 4/1987 | Dlugos . |
| 4,706,095 | 11/1987 | Ono et al. ........................... 235/385 X |
| 4,706,096 | 11/1987 | Sato .................................... 235/385 X |
| 4,734,710 | 3/1988 | Sato et al. ........................... 235/385 X |
| 4,734,713 | 3/1988 | Sato et al. ........................... 235/385 X |
| 4,746,932 | 5/1988 | Sato .................................... 235/432 X |
| 4,758,717 | 7/1988 | Shepard et al. . |
| 4,794,239 | 12/1988 | Allais . |
| 4,835,713 | 5/1989 | Pastor . |

(List continued on next page.)

FOREIGN PATENT DOCUMENTS

| | | |
|---|---|---|
| 467015 | 1/1992 | European Pat. Off. . |
| 61-140825 | 6/1986 | Japan . |
| 6263131 | 9/1994 | Japan . |

OTHER PUBLICATIONS

Telxon Corporation brochure entitled "PTC–1140 Wireless Pen–Based Computer" dated Jan. 1994.
Telxon Corporation brochure entitled "PTC–1180 Wireless Pen–Based Computer Tablet", dated Jan. 1994.
Telxon Corporation brochure entitled "The Wireless Hospital–Time and Cost Saving Solutions for Healthcare Information Networks", copyright 1994.
Magazine article from *Automatic I.D. News* entitled "Pen–Based System to the Rescue: Speeds Fire Inspections and More," p. 21, dated Apr. 1994.
Advertisement in *Automatic I.D. News* magazine for Monarch Marking Systems, Thermal Transfer Renegade printer, p. 22, dated Apr. 1994.
Monicor Electronic Corp. brochure for monicor model IC–100 Radio modem entitled "Monicor Snap–On Radio Modem for Mars Electronics MEQ™ Terminals," undated.
Article entitled "A Primer for Two Dimensional Bar Codes, Portable Data Files, And PDF417" by Symbol Technologies, Inc. Bohemia, NY, dated Oct., 1990.

*Primary Examiner*—Donald T. Hajec
*Assistant Examiner*—Jeffrey R. Filipek
*Attorney, Agent, or Firm*—Watts, Hoffmann, Fisher & Heinke Co., L.P.A.

[57] ABSTRACT

A bar code scanning and labeling apparatus for scanning and decoding a bar code associated with a product and generating a two dimensional bar code dataform incorporating selected data including at least a portion of the decoded, product related data from the product's bar code and additional data related to the product is disclosed. The apparatus includes a microprocessor having data selection circuitry adapted to retrieve the selected data and to assemble the retrieved selected into a format suitable for encoding. A method of providing a modified bar code dataform using the apparatus is also disclosed. The steps of the method include: scanning and decoding a product's bar code dataform; selecting data to comprise the modified bar code dataform, the selected data including decoded data relating to the product from the product's bar code dataform and additional data related to the product; and utilizing the selected data to produce the modified bar code dataform.

26 Claims, 5 Drawing Sheets

U.S. PATENT DOCUMENTS

| | | |
|---|---|---|
| 4,889,982 | 12/1989 | Young et al. . |
| 4,916,441 | 4/1990 | Gombrich . |
| 5,015,831 | 5/1991 | Eastman et al. . |
| 5,113,445 | 5/1992 | Wang . |
| 5,130,520 | 7/1992 | Shepard et al. . |
| 5,144,120 | 9/1992 | Krichever et al. . |
| 5,227,617 | 7/1993 | Christopher et al. .................. 235/462 |
| 5,243,655 | 9/1993 | Wang . |
| 5,278,396 | 1/1994 | McGaha ................................. 235/383 |
| 5,304,786 | 4/1994 | Pavlidis et al. . |
| 5,329,107 | 7/1994 | Priddy et al. ......................... 235/494 |
| 5,334,824 | 8/1994 | Martinez ................................ 235/380 |
| 5,337,361 | 8/1994 | Wang et al. . |
| 5,367,152 | 11/1994 | Krichever et al. . |
| 5,382,779 | 1/1995 | Gupta ..................................... 235/432 |
| 5,386,106 | 1/1995 | Kumar ................................ 235/472 X |
| 5,448,046 | 9/1995 | Swartz ................................... 235/432 |

BAR CODE DATAFORM SCANNING AND LABELING APPARATUS AND METHOD

FIELD OF THE INVENTION

This invention relates to a bar code dataform scanning and labeling method and apparatus and, more particularly, a method and apparatus capable of scanning a bar code dataform, modifying encoded bar code dataform data and printing a bar code dataform label incorporating the modified data.

BACKGROUND ART

The application and use of bar codes and matrix codes are well known and growing. Bar codes and matrix codes are forms of "dataforms," which for present purposes are defined to include all arrangements whereby data is fixed in some form of machine readable copy. Thus, dataforms include one and two dimensional bar codes, matrix codes and graphic codes, as well as words and numbers and other symbols, which may be printed or etched on paper, plastic cards and metallic and other items. Dataforms may be printed in invisible ink, magnetically recorded via magnetic strips or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing in a graphic image can be acquired by use of a scanner, a laser scanner or other suitable device which is capable of distinguishing between different reflective values of light reflected from a dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area.

In other applications, such as laser engraving on silicon wafers, illumination may result in a dark and light pattern or relationship in one orientation and an opposite light and dark relationship in a different orientation. In addition to pixel values representing reflective values of light ("light" being defined as encompassing the entire electromagnetic spectrum for present purposes), in other arrangements, pixel values representative of reflective values may be based upon reflection of sound waves or other mediums from a dataform of an appropriate configuration. In any arrangement in which a dataform is arranged to be read on the basis of reflective values, such reflective values may typically be stored as pixel values in an image buffer memory or other storage medium in bit map or other form which, representative of pixel values for an image, may utilize any appropriate data storage format.

The use of bar code dataforms for product identification purposes has achieved widespread acceptance. Typically, the manufacturer of a product generates a bar code dataform which represents a unique product identification key. The bar code dataform is used in conjunction with a computer accessible database. The identification key is associated with or, using computer terminology, points to a record address in a data file stored on a database secondary storage device.

A product address consists of specific data values for data items or fields comprising the file. For example, data items in a simple pricing file may include a product stock keeping unit number, a product descriptor and a price per unit.

A typical one dimensional (1D) bar code dataform consists of a single row of varying width parallel dark bars separated by varying width spaces. Start and stop patterns are provided at the beginning and end of the bar code dataform to indicate the boundaries of the actual coding area. The width of the bars and spaces in the coding area represent numbers. A unique product identification key is assigned for each product and converted or encoded into a unique bar code dataform according to the selected bar coding logic.

In use, the bar code dataform is scanned to identify a product and retrieve information relating to the product. The scanned image is converted or decoded into its numerical representation, i.e., the product identification key. The product identification key is not itself a record address for a file but rather is converted into a record address by a mathematical algorithm. This is necessary because there may be a plurality of files associated with a product. For example there may be a pricing file, an inventory file and a purchasing file each requiring a different algorithm to convert a product's identification key to a corresponding record address for the product in that file.

Typically, a merchandiser, i.e., a wholesaler, distributor or retailer, will use the identification key as part of a pricing and inventory control system. For example, at the retail level, a retailer utilizing a computerized point of sales network for pricing and inventory will have at least two files accessible to the central computer controlling the network; a pricing file and an inventory file. The pricing file correlates a product's stock keeping unit identification number with the current price of the item, while the inventory file indicates the number of product units on hand. In this scenario, two mathematical algorithms are used to convert the product's bar code identification number into corresponding record addresses in the pricing file and the inventory file, respectively.

At the retail level, a point of sales terminal includes a bar code dataform reader which scans and decodes the product's bar code dataform and communicates the decoded identification key to a computer along with a signal indicative of a purchase. The computer employs the appropriate mathematical algorithms to access the pricing and inventory files. The current price, stock keeping unit number and product descriptor for the product being purchased is retrieved from the pricing file and communicated to the point of sale terminal. The price of the product is displayed at the point of sale terminal and an appropriate purchase receipt is generated for the customer. Additionally, the computer decrements the inventory file to reflect removal of the product from inventory.

Unfortunately, while the manufacturer's bar code dataform is valuable to merchandisers, its utility is limited because the original bar code dataform does not reflect transactional information relating to sales of the product as the product moves through the various level in its distribution channel (e.g., manufacturing or importation level, assembly level, wholesale level, distribution level, repackaging level, retail level, etc.)

A merchandiser will find it valuable to have a bar code dataform which provides more than just a product identification key. For example, a retailer may wish to incorporate information relating to where and when the product was purchased, at what price, where is it being stored, to which store will it be shipped. If the retailer has modified the product or added an option, for example, a car dealer rustproofs a new car received from the manufacturer, the retailer may want to modify the manufacturer's bar code dataform to reflect the value added. Upon sale of the product, the retailer may wish to modify the manufacturer's bar code dataform to incorporate sales transaction information, e.g., who bought the product; on what date was the product purchased; at what price; under what invoice number; is there a discount or promotional program associated with the product; and where is the product to be delivered?

The addition of new information will often necessitate the use of a different bar code dataform format than the one selected by the manufacturer. Most manufacturer's use a 1D bar code dataform such as the UPC bar code which has a very limited data capacity. A stacked or two dimensional (2D) bar code dataform may be utilized by a merchandiser to increase data capacity.

A 2D bar code dataform permits a greater amount of encoded data to be stored in a given bar code coding area. Instead of having a coding area occupied by a single row of bar code, as in a 1D bar code dataform, a 2D bar code dataform divides the total coding area into a plurality of parallel rows, each row representing an independent coding area permitting multiple rows of bar code. Additionally, more sophisticated coding strategies have been developed which permit a greater density of data as compared to the original varying width format of the UPC bar code.

A 2D bar code dataform is disclosed in U.S. application Ser. No. 08/280,490 filed on Jul. 26, 1994, entitled "Packet Bar Code Encoding and Decoding," which is incorporated in its entirety herein by reference.

The following example illustrates the desirability of providing a distributor of books with an apparatus which would have the capability of scanning the original bar code dataform on a product, adding additional data to the scanned data and generating a modified bar code dataform label to be affixed to the product, the modified bar code dataform incorporating the additional data.

Distributors of many products with a limited market life cycle, such as books, are contractually obligated to buy back unsold merchandise from retailers after a certain period of time. The retailer will often receive several shipments of the same book from a distributor over the course of the book's market life, paying a different price each time.

The books include a bar code dataform, typically a UPC bar code, imprinted on the back cover by the publisher, but the price that the retailer pays the distributor is, of course, not reflected in the publisher's bar code dataform. When the time comes for the distributor to buy back the retailer's unsold books, the retailer returns the books and alleges that the unsold books are the ones that were purchased at the highest price during the book's market life so that he or she can receive the largest possible refund from the distributor.

With prior art systems, the distributor had no means of distinguishing among the returned books to ascertain the retailer's true purchase price and, therefore, was forced to repurchase the unsold books at the highest price paid by the retailer. If the distributor affixed a second bar code dataform label to the books shipped to the retailer which incorporated sales transaction information including the price paid by the retailer, the distributor would be able to scan the second bar code dataform label on the returned books and determine the price paid by the retailer for each of the returned books. If the second bar code dataform label also included the date the book was shipped to the retailer, scanning the returned book's second bar code dataform label would provide information to the distributor regarding how long the retailer has held the book in inventory and whether the retailer is properly "rotating" his or her stock using a first in, first out method of inventory control.

DISCLOSURE OF THE INVENTION

A method of providing modified bar code dataform data is disclosed. The method includes the steps of: scanning a bar code dataform having encoded product data; selecting data to comprise the modified bar code dataform, the selected data including scanned data developed by the scanning step and data retrievable from a data storage device; and utilizing the selected data to produce the modified bar code dataform.

The modified bar code dataform will preferably be applied by printing the modified bar code dataform on a label. Normally, the selected data will include sales transaction data. Additionally, the selected data may be modified and the modified data utilized to produce the modified bar code dataform. A visual representation of the scanned data and the selected data may be provided.

A bar code scanning and label generating apparatus in accordance with the present invention includes a microprocessor, a scan engine coupled to the microprocessor for scanning a bar code dataform, and a decoder/encoder electrically coupled to the microprocessor for decoding a scanned bar code dataform into machine readable data and encoding machine readable data into a bar code dataform. The apparatus further includes interface means coupled to the microprocessor for actuation of the apparatus and selection of data to be included in a modified bar code dataform, the dataform including at least a portion of the scanned dataform data and additional data. An electronic memory electrically coupled to the microprocessor is provided for storing data. Preferably, the apparatus further includes communications circuitry for transmitting data to and data from a remote device, the data received from the remote device including at least a portion of the additional data.

Data retrieval circuitry, embodied in the microprocessor, is provided for retrieving the selected data stored in the apparatus' electronic memory and utilizing the communications circuitry to retrieve selected data not stored in the apparatus' electronic memory. The data retrieval circuitry further assembles the selected data in a format suitable for encoding. The microprocessor further includes processing circuitry for modifying the selected data in accordance with commands input to the microprocessor through the interface means. The apparatus additionally includes a label printer for printing a label incorporating the modified bar code dataform.

The scanning and labeling apparatus preferably includes a visual display for displaying a human readable representation of the scanned data and the selected data.

Preferably, the bar code dataform generated is a 2D bar code dataform. The communications circuitry for sending and receiving data may include a transceiver for sending and receiving RF data signals from a remote device.

An object of the present invention is to provide a novel and unique method of scanning and decoding a bar code dataform and producing a modified bar code dataform incorporating additional data. It is a further object of the present invention is to provide a method of scanning and decoding a bar code dataform, modifying the decoded bar code dataform data and producing a modified bar code incorporating the modified bar code dataform data.

Yet another object of this invention is to provide a novel and unique bar code dataform scanning and labeling apparatus including a bar code dataform scanner and decoder, communications circuitry for sending and receiving data, memory for storing decoded bar code data and additional data and a microprocessor for generating a bar code dataform incorporating at least a portion of the decoded bar code data and at least a portion of the additional data. At least a portion of the additional data may be retrieved from a remote device.

These and other objects, advantages and features of the invention will become better understood from a detailed description of the a preferred embodiment which is described in conjunction with the accompanying drawings.

DETAILED DESCRIPTION

Figure 1:
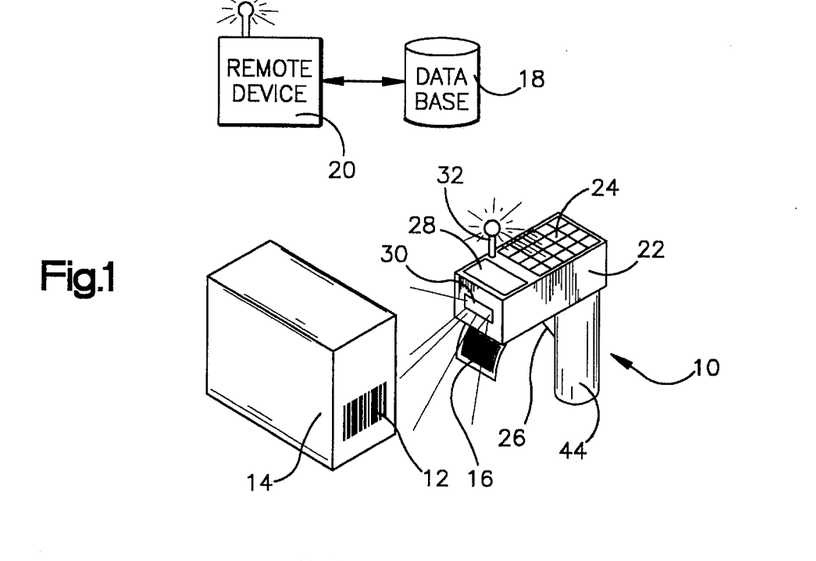
FIG. 1 is a schematic representation of a portable scanning and labeling apparatus embodying the present invention, a remote central computer and database.

FIG. 1 illustrates the preferred embodiment of a bar coding scanning and labeling device 10 of the present invention. The scanning and labeling device 10 is adapted to scan an original bar code dataform 12 affixed to a product 14 and print a modified bar code dataform 16 on a label 17. The label 17 preferably includes an adhesive backing for affixing the label to the product 14. The modified bar code dataform 16 incorporates additional data such as data retrieved from a database 18 accessed through a remote device 20 as well as scanned data from the original bar code dataform 12.

A microprocessor 21 (FIG. 3) is enclosed in a housing 22. A user interfaces with the microprocessor 21 through a keypad 24, a trigger switch 26 and a visual display 28. Microprocessor execution is controlled by programs coded in read only memory (ROM) 29. The microprocessor 21, responding to commands entered by a user of the scanning and labeling device 10, controls various operations of the device including; a) scanning of the original bar code dataform 12; b) decoding of the original bar code dataform; c) displaying the decoded data (optional); d) retrieving and assembling the data selected by the user; d) displaying the selected data (optional); e) processing/modifying selected data; f) encoding the selected data (as modified) to generate the modified bar code dataform 16; and g) printing the modified bar code dataform on the label 17.

The keypad 24 and the trigger switch 26 are used to actuate the scanning and labeling device 10 to scan the original bar code dataform label 12 and to print the modified bar code dataform 16 on the label 17. Additionally, the keypad 24 permits input of data and entry of user instructions via appropriate keystrokes. Such user instructions include: a) selecting data fields to be included in the modified bar code dataform 16 for the product 14, normally the selected data fields will require retrieval of data including scanned data from the original bar code dataform 12 and additional data; b) optionally processing/modifying retrieved data corresponding to the selected data fields; and c) confirming the data item values to be included in the modified bar code dataform.

The scanning and labeling device 10 includes a scan engine 30 for scanning the original bar code dataform 12 and communications circuitry 31 (FIG. 3) including a transceiver coupled to an externally mounted antenna 32. The database 18 will be part of the user's point of sale network and will include purchasing and sales files as well as inventory and product information files.

The database 18 is accessed through the remote device 20, typically a computer, which also includes a transceiver for communications via radio frequency (RF) signals with devices such as the scanning and labeling device 10 as well as other remote devices.

Although not shown in FIG. 1, it should also be appreciated that the additional data incorporated in the modified bar code dataform label 16 may be stored at locations other than the remote database 18. For example, the additional data may have been previously stored in the device's internal random access memory (RAM) 36 or stored on a PCMCIA card (not shown) inserted into a socket or connector (not shown) on the scanning and labeling device 10.

Additionally, although it is contemplated that the product 14 includes a bar code dataform, the scanning and labeling device 10 can still be utilized to generate a "modified" bar code dataform. Assuming the product 14 does not have a bar code dataform but instead includes a pricing label which sets forth the product stock keeping unit number, the product price, the department the product is sold in, etc. In this situation, the user of the scanning and labeling device 10 will utilize the keypad 24 to manually input some or all of the human readable data from the pricing label. This manually input data may be supplemented with additional retrieved data from the remote database 18, the device's RAM memory 36 or a PCMCIA card to generate the "modified" bar code dataform 16.

Moreover, it should also be noted that the modified bar code dataform 16 may be generated without incorporating additional retrieved data. The selected data may be modified by the user through data manipulation commands input through the keypad 24. For example, some or all of the selected data may be modified through the use of a mathematical algorithm or formula or the application of Boolean logic operations to binary data. Of course, a bar code dataform which is identical to the original bar code dataform 12 except that one or more of the data items in the original bar code have been deleted would properly be defined as a modified bar code dataform as contemplated by the present invention. A modified bar code would also properly be defined by a bar code which contains data identical to the original bar code data but the bar code format is different, e.g., the modified bar code dataform is represented in a 2D format while the original bar code dataform is in UPC format. **The modified bar code dataform may contain data representative of the original format.

In an assembly line embodiment of this invention the modified bar code dataform may track the product down the line. The additional data incorporated into a modified bar code dataform may include data representative of a processing step performed on a product. For example, a car tracking dataform may be updated when rust proofing is added to the car, or quality control testing data may be added when the product is quality control tested.**

Additionally, it is within the scope of this invention to have the scanning and labeling apparatus 10 generate a label 17 which includes human readable characters (not shown in FIG. 1, but shown schematically at 350' on a label 345' in FIG. 5) in addition to the modified bar code dataform. In a retail setting, the printed "label" may, in fact, be a customer sales receipt which includes the modified bar code along with human readable data or characters setting forth a product identification number, a product descriptor, a sales price of the product, a date of sale, store identification number, etc. At a wholesale level, a wholesaler may find it advantageous to generate an adhesive backed modified bar code label for application to a product wherein the label additionally includes human readable characters such as the product's stock keeping unit number, date placed into inventory, etc.

The microprocessor 21 is programmed to properly respond to user commands and/or data input in the form of keystrokes on the keypad 24. The user may use the keypad to input data manually, to select data to be incorporated in the modified bar code dataform, to manipulate the selected data, and to confirm the selected data for incorporation into the modified bar code dataform 16.

Figure 3:
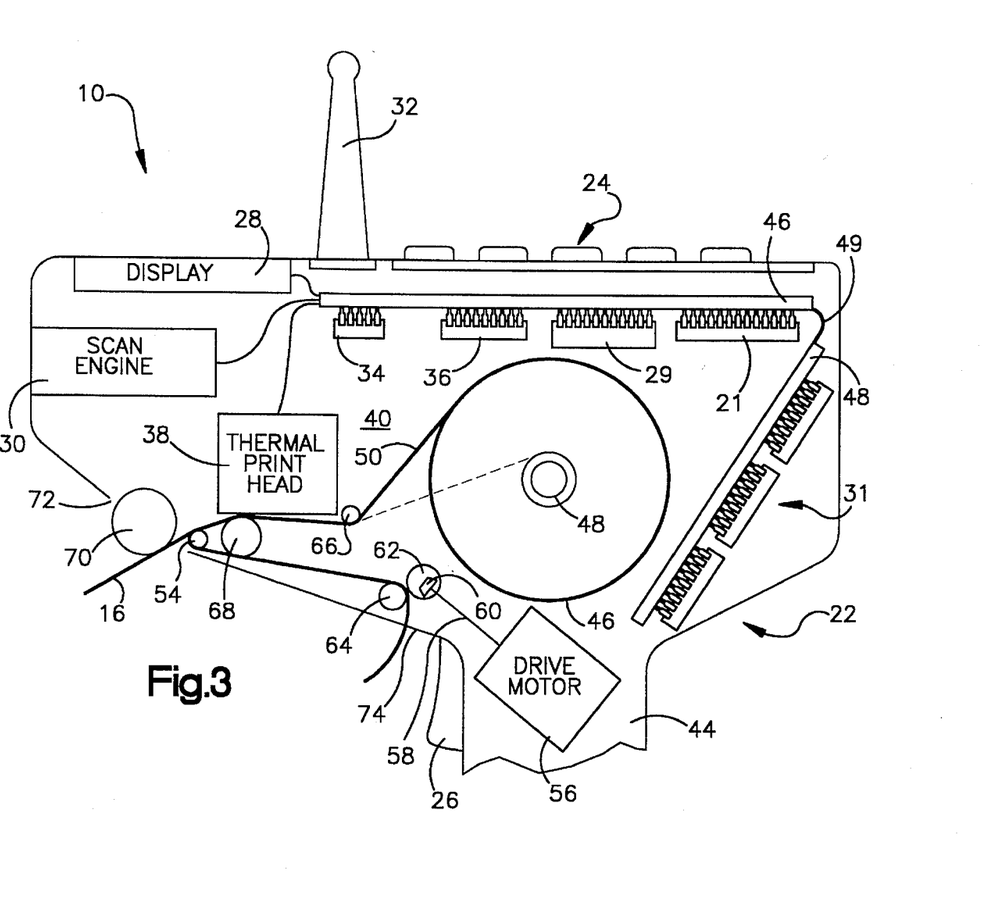
FIG. 3 is a schematic representation of a portion of a hand-held scanning and labeling apparatus of FIG. 1.

Additionally, data retrieval circuitry embodied in the microprocessor 21 retrieves data from the scanning and labeling device's RAM memory 36, from a PCMCIA card connected to the device 10, or, in conjunction with the communications circuitry 31, from the remote database 18. Further, the microprocessor 21 data retrieval circuitry assembles the data, including manipulated data, corresponding to the selected data fields in a format suitable for encoding by the encoding/decoding circuitry 34. Application software (not shown) resident in ROM memory 29 is provided to permit the user to choose, through keypad keystrokes, the desired bar code format of the modified bar code dataform 16, e.g., UPC, Code 39, Codabar, Code 49, Code 16K, etc.

The keypad 24 is used to select the data fields to be incorporated in the modified bar code dataform 16 for the product 14. Alternately, application software (not shown) may be used to select the data fields to be incorporated in the modified bar dataform 16. The microprocessor data retrieval circuitry retrieves data corresponding to the selected data fields. For ease of discussion, data retrieved by the microprocessor 21 corresponding to the selected data fields will be denoted as "selected data." At least a portion of the decoded data from the original bar code dataform 12 is among the selected data. Normally, additional data not included in the original bar code dataform 12 is also selected. When the selected data is retrieved by the microprocessor 21, the data and corresponding data fields are optionally displayed on the visual display 28. Displaying the data and data fields on the visual display 28 permits the user to confirm the selected data or, if desired, to modify some or all of the data and/or delete certain selected data items to prevent their incorporation in the modified bar code dataform 16.

Figure 2:
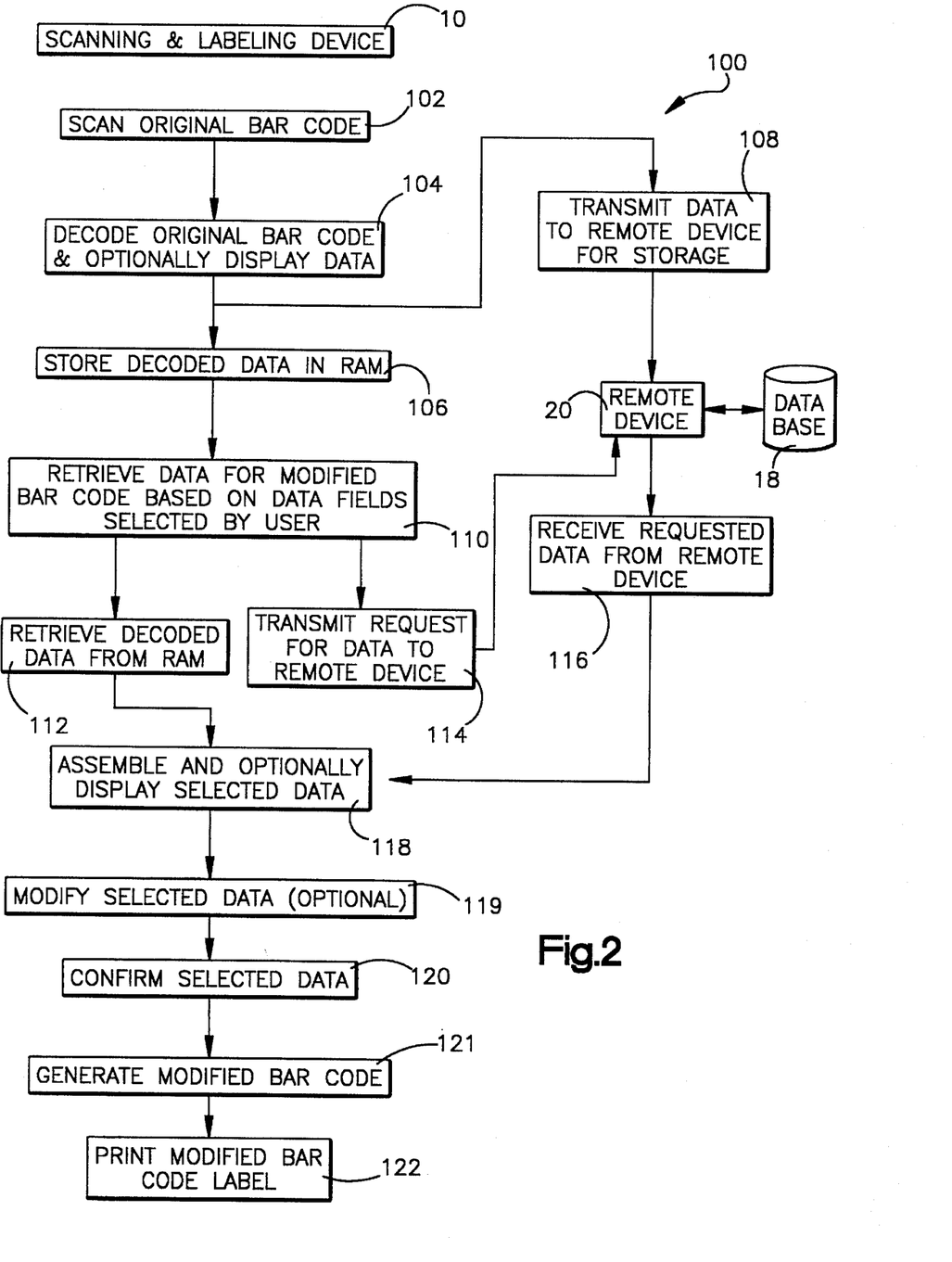
FIG. 2 is a block diagram of a method of producing a modified bar code dataform label including decoded data from a first bar code dataform and data received from the remote device.

FIG. 2 illustrates, in block diagram form, a method 100 of the present invention. The method 100 includes the steps of actuating the scanning and labeling device 10 to scan the original bar code dataform 12 (shown at 102). The scanned bar code dataform 12 may be a 1D or 2D bar code dataform. At 104, encoding/decoding circuitry 34 (FIG. 3) disposed in the scanning and labeling device 10 decodes the scanned bar code dataform 12 into machine readable data for storage. The encoding/decoding circuitry 34 preferably also converts the bar code into human readable alphanumeric representations (for example, using the ASCII character set) which are displayed on the visual display 28.

The decoded data is stored in the device's RAM memory 36 (shown at 106). Typically, a portion of the decoded original bar code data will be transmitted to the remote device 20 for updating or confirming data relating to the product 14 (shown at 108). Based on data fields selected by the user, data corresponding to the selected data fields is retrieved (shown at 110).

If the data for a selected data field is stored in the scanning and labeling device's RAM memory 36 or in a PCMCIA card connected to the device 10, the microprocessor 21 directly retrieves the data (shown at 112) and stores it in data registers in the microprocessor. If the data for a selected data field is stored in the remote database 18, the microprocessor utilizes the communications circuitry 31 to access the selected data through the remote device 20 (shown at 114, 116).

The microprocessor 21 formulates a query for the required data which is transmitted by the communications circuitry 31 to the remote device 20. In response to the query, the remote device 20 accesses the database 18 and retrieves the required data. As shown at 116, the communications circuitry 31 receives RF signals including the required data for the specified data fields from the remote device 18 and loads the data into data registers in the microprocessor 21.

As is shown at 118, the microprocessor 21 assembles the selected data into a form suitable for encoding by the encoding/decoding circuitry 34 and optionally displays the selected data. The microprocessor 21 checks the assembled data to insure that the data to be incorporated into the modified bar code dataform 16 is able to be fit into the bar code coding area.

If desired, the user may modify the selected data through processing commands input through the keypad 24 (shown at 119). The processing may include mathematically manipulating the selected data to generate new data values, which, in turn, may be incorporated into the modified bar code dataform 16 either in lieu or in addition to the original selected data. As an example, assume that the user of the scanning and labeling device 10 knows that data in a specific data field, e.g., product price, retrieved from the remote database 18 needs to be changed because of a recently instituted promotional campaign offering a 10% discount on the product 14.

The microprocessor 21 includes an arithmetic logic unit programmed to execute such discounted price calculations. The non-discounted price is retrieved from the database 18 and displayed in human readable form on the visual display 28. By inputting a short series of keystrokes on the keypad 24, the user inputs the discount percentage and commands the microprocessor to calculate a modified price for the product 14. The modified price is displayed, in human readable form, on the visual display 28 and, upon confirmation by the user, is selected for inclusion in the modified bar code dataform 16 in lieu of the non-discounted price.

After processing is complete, the visual display 28 provides the user with an updated human readable representation of the data to be incorporated in the modified bar code dataform 16. If the data to be displayed exceeds the character capacity of the display 20, a sequential paging prompt is provided on the keypad 24 to permit the user to page through all of the selected data. The user confirms the displayed data items with an appropriate keystroke command (shown at 120).

Upon receiving confirmation, the microprocessor 21 transfers the machine language data representation of the selected data to the encoding/decoding circuitry 34. The encoding/decoding circuitry 34 generates the modified bar code dataform 16 (shown at 121) in conformity with the bar code format selected by the user. The modified bar code dataform 16 preferably uses a 2D format to permit greater data capacity in a given coding area.

As shown at 122, the user uses the keypad 24 to actuate a printer assembly including a thermal print head 36 (FIG. 3) to print the modified bar code dataform 16 on the label 17.

For example, assuming the user is a retailer, the user may request additional data concerning the product such as date of purchase of the product from the product's distributor, purchase price and/or identification of distributor/manufacturer the product was purchased from. Other examples of data that a retailer may find advantageous to incorporate in a modified bar code dataform would include identification of the warehouse where the product will be stored, the identification of the store where the product will be offered for sale. If the product has been purchased by a customer, the retailer may request data for data items related to the sales transaction such as sales date, selling price, customer identification number, a designation of whether the item is returnable by the purchaser for refund or credit or was sold as a close out item, length of warranty period and value added options/modifications added by the retailer.  If the retailer sells a product on a lay-away plan or on an extended payment basis, the modified bar code dataform may include the down payment, account balance and payment history. When future payments are made, the retailer can read the modified bar code dataform, and generate a new modified bar code dataform incorporating the new payment information.

FIG. 3 is a schematic representation of a preferred embodiment of the bar code scanning and labeling device 10. The scanning and labeling device housing 22 defines an interior region for electronics and mechanical components of the device 10. The housing 22 includes apertures for the scan engine 30, the visual display 28, the antenna 32 and the keypad 24. The trigger switch 26 extends through an aperture in a handle portion 44 of the housing 22. The housing 22 is preferably comprised of a high impact, heat resistant, electrically nonconductive thermoplastic material.

The microprocessor 21, the communications circuitry 31, the ROM and RAM memories 29, 34 and the encoding/ decoding circuitry 34 are comprised of integrated circuit chips suitably mounted on a motherboard 46. The communications circuitry is similarly mounted to a second motherboard 48 which is electrically coupled to the motherboard 46 via a data and address bus 49. The motherboards 46, 48 are appropriately secured to interior walls of the housing 22.

Any scan engine of conventional design will function appropriately in the device 10. Preferably, the scan engine 30 includes a laser (not shown) for producing a narrow beam of light and a scanner (not shown) for moving the beam of light across a target field. The scanner comprises an oscillating mirror from which the beam is reflected. Alternately, the laser can be oscillated to sweep the beam across the bar code dataform 12. The scan engine will also contain a photo detector (not shown) that collects reflected light from at least part of the scanned label 12. The bars and spaces comprising the bar code have differing light reflectivity. When the laser beam is scanned across the bar code, the signal from the photodetector will vary with the varying light reflectivity. The scan engine 30 utilizes known positions of the laser beam and known beam sweep speeds to geographically locate light and dark spots to produce a signal representative of an image of the bar code dataform 12. ** The reader could also be an image sensor array reader, such as the one described in Ser. No. 08/332,592, filed Oct. 31, 1994, and incorporated by reference herewith.

The scanning and labeling device communications circuitry 31 includes a spread spectrum radio module for real time communication with remote devices including the remote device 20.

A label supply roll 46 is rotatably supported on an axle 48. The axle 48 extends between opposite walls of the housing 22. The roll 84 is comprised of a composite web 50 and a plurality of spaced apart labels adhering to the web (only the modified bar code dataform label 16 is shown peeled from the web). A full roll is shown in solid while a depleted roll is shown in phantom line. The labels are releasably secured to the web 50 by a pressure sensitive adhesive. A layer of silicone is coated on the upper surface of the web 50 facing of the labels so that the labels are sheared or peeled from the web as the web advances in a curvilinear path around a small diameter peel roller 54.

The modified bar code dataform label 16 is illustrated in a peeled position with respect to the web 50. In response to actuation of the trigger switch 26, an electric drive motor 56 drives a shaft 58 having a bevel gear 60 affixed to one end of the shaft. The bevel gear 60 coacts with a drive gear (not shown) coupled to a drive roller 62 to rotate the drive roller. The drive roller 62 cooperates with an idler roller 64 to advance the web 50 past the thermal printhead 38. The printhead 34 prints the modified bar code dataform on the leading label as the label passes under the printhead. A guide roller 66 and a platen 68 properly position the web 50 under the printhead 34.

An applicator roller 70 extending through a label exit opening 72 supports the peeled off label 17 in a position for application to the product 14. The web 50 exits the housing 22 through a web exit opening 74.

Figure 4:
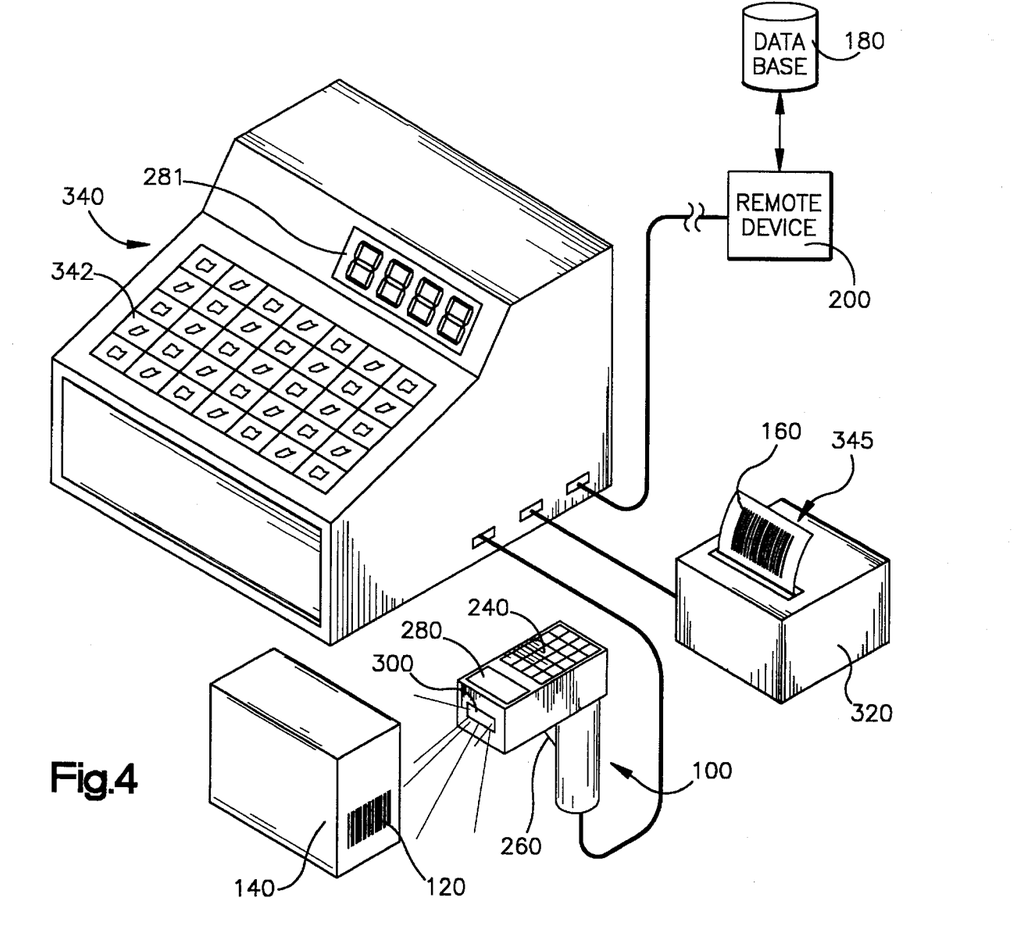
FIG. 4 is a schematic representation of an alternate embodiment of the apparatus of FIG. 3 wired to a point of sales terminal and including a printer wired to the point of sales terminal.

FIG. 4 illustrates an alternate configuration for producing a modified bar code label 160. In this configuration, a scanning device 100 is used to scan a bar code dataform 120 of a product 140. The scanning device 100 includes a keypad 260, an actuation trigger 260, a visual display 280 and a scan engine 300. The visual display 280 is optional. The scanning device 100 does not include a printing assembly in this embodiment. Rather, the modified bar code dataform 160 is printed at a printer 320. The scanning device 100 and the printer 320 are hard wired to a point of sale terminal/cash register 340. Also shown wired to the point of sale terminal/cash register 340 is a remote device 200. The remote device 200 may be a mainframe computer, a minicomputer or a microcomputer and is connected to and accesses a database 180.

The product 140 is selected for purchase. The scanning device 100 is used to scan the bar code dataform 120. Decoding/encoding circuitry (not shown) in the scanning device 120 decodes the scanned label into machine readable data. A microprocessor, which may be disposed either in the point of sale terminal 340 or in the scanning device 100, causes the decoded data to be transmitted to RAM memory (not shown). The RAM memory may be located in either the point of sale terminal 340 or the scanning device 100. An ASCII representation (or another human readable conversion scheme) of the decoded data is displayed on a visual display 280. The human readable representation of the decoded data may also be displayed on a visual display 281 of the point of sale terminal 340. If desired, one of the visual displays 240, 281 may be omitted. Using communications circuitry (not shown) the microprocessor transmits scanned data to the remote device 200 to update the remote database 180.

As described with respect to the embodiment shown in FIG. 1 above, using appropriate keystrokes on the keypad 240, the user may select data items for incorporation into the modified bar code dataform 160, manipulate the selected data, confirm the selected data, and actuate the printer 320 to print a label 345 including the modified bar code dataform. Depending on its anticipated use, the label may or may not include an adhesive backing. If, for example, the label 345 is to be used as a customer receipt, the label will include human readable characters (not shown, in FIG. 6 the label 345' includes representations of human readable characters 350'). Typical human readable characters would include data relating to the product number, product description, product price, date of purchase, etc. Such a customer receipt label would normally not have an adhesive backing.

In response to the user's selection of data fields to be included in the modified bar code dataform, the microprocessor utilizes communications circuitry (not shown) and queries the remote device 200 to retrieve data not stored in RAM memory accessible to the microprocessor (or a PCMCIA card accessible to the microprocessor). The selected data is retrieved and display on one or both of the visual displays 281, 281. The user may manipulate the selected data as described with respect to the embodiment shown in FIG. 1. The keypad 240 or a keyboard 342 of the point of sale terminal 340 may be used to input commands to the microprocessor to manipulate the selected data. Additionally, the keypad 240 or keyboard 342 may be utilized to input data in the form of human readable characters. If desired, one of the keypad 240 and keyboard 342 may be omitted.

After confirmation by the user (via keystroke commands) of the selected data, the microprocessor assembles the data into a format suitable for encoding into a selected bar code dataform format. Upon user command, the encoded bar code representation is printed on the label 345 by the printer 320.

Figure 5:
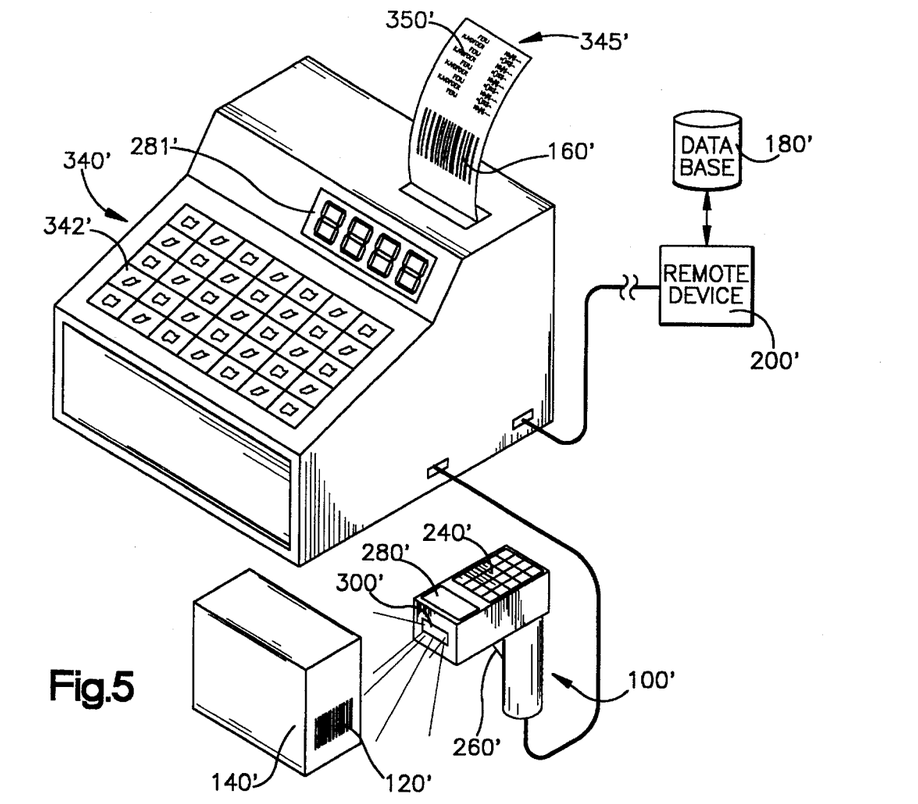
FIG. 5 is a schematic representation of an alternate embodiment of the apparatus of FIG. 3 wired to a point of sales terminal having an integral printer.

FIG. 5 is another configuration for producing a modified bar code dataform 160. The FIG. 5 configuration is similar to the configuration shown in FIG. 4 except that the printer 320 of the FIG. 4 configuration is integrated into the point of sale terminal 340'. A receipt 345' printed by the point of sales terminal 340' may include human readable transaction information, represented schematically by lines at 350, along with the modified bar code dataform 160'.

Figure 6:
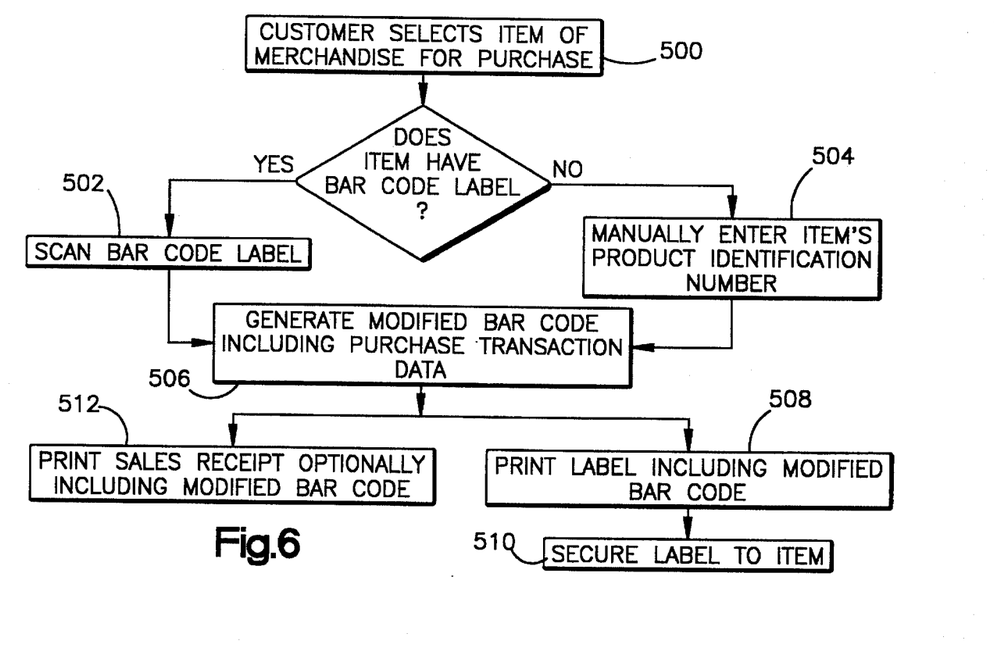
FIG. 6 is a block diagram illustrating an exemplary use of a modified bar code dataform for a purchased product in a retail environment.
Figure 6A:
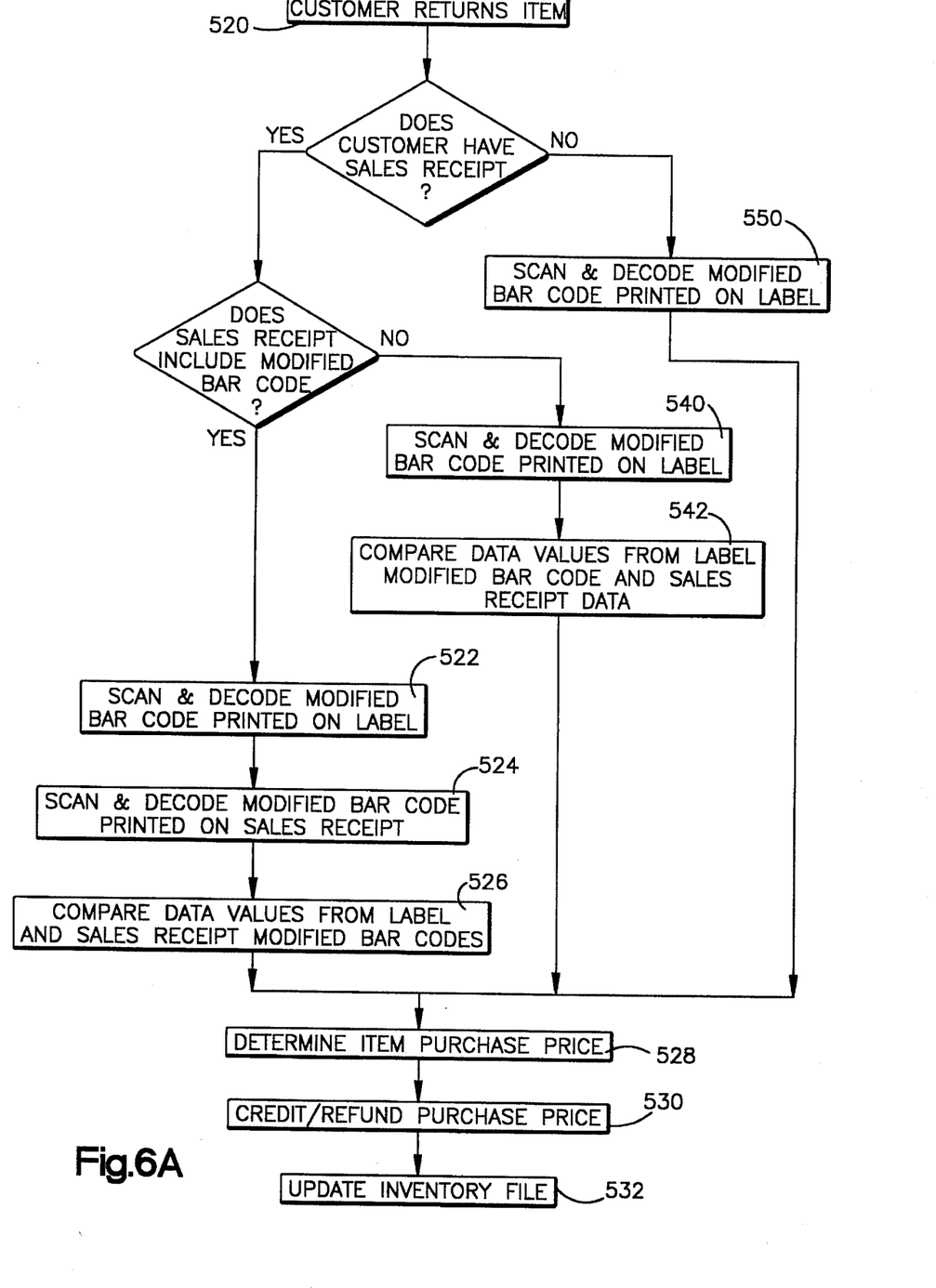
FIG. 6A is a block diagram illustrating an exemplary use of the modified bar code dataform of FIG. 6 wherein a customer returns the purchased product.

The block diagram shown in FIG. 6 represents a typical application of a modified bar code dataform in a retail environment involving a purchase of an item of merchandise by a customer. FIG. 6A is related to FIG. 6 and illustrates in block diagram form an example of the use of the modified bar code in a return situation.

As will be illustrated the modified bar code dataform, which incorporates additional data relating to the sales transaction may advantageously be employed in a return of merchandise situation to both increase the speed and improve the integrity of the return process. It is assumed that the retailer has a pricing file and an inventory file stored in a database. It is also assumed that the configuration shown in FIG. 4 is employed by the retailer.

Turning to FIG. 6, a customer selects an item of merchandise for purchase (shown at 500) and takes the item to the point of sale terminal 340. If the item includes an original bar code dataform, the scanning device 100 is employed to scan the bar code (shown at 502). The purchase price for the item is retrieved from the pricing file record associated with the item and the inventory file record associated with the item is appropriately decremented.

If the item does not include a bar code dataform, the item's stock keeping unit number is input through the keypad 240 or the keyboard 340 (shown at 504). The purchase price for the item is retrieved and the inventory file record is appropriately decremented described previously.

In either case, a modified bar code dataform is generated based on data selected by the retailer (shown at 506). Advantageously, the selected data includes additional data regarding the purchase transaction, at a minimum, the sales price of the item and the purchase date.

The modified bar code is printed on the adhesive backed label 345 (shown at 508) and the label is affixed to the item (shown at 510). In addition to the label 345, a customer receipt is printed by the point of sale terminal 340 (shown at 512). The customer receipt includes human readable data characters setting forth the item's stock keeping unit number, a product descriptor for the item, the item purchase price, the date of purchase, store name and number, etc. The customer receipt preferably also includes the modified bar code dataform.

FIG. 6A is a block diagram representation of the return process. The item purchased is presumed to have affixed to it the modified bar code dataform label as described with respect to FIG. 6 above.

The item of merchandise is returned by the customer to the retailer (shown at 520). If the customer has the sales receipt and the sales receipt includes the modified bar code dataform, the modified bar code dataform printed on the sales receipt and the modified bar code dataform printed on the label 345 are scanned and decoded (shown at 522, 524). The decoded values are compared to validate the item purchase price, date of sale and item stock keeping unit number (shown at 526).

If the decoded data values of the label and sales receipt agree with each other and the human readable characters on the sales receipt, the purchase price is determined (shown at 528) and the item purchase price is refunded or credited to the customer (shown at 530). The record for the file is appropriately updated in the inventory file to reflect the item's return to inventory (shown at 532).

In this case, the modified bar code dataforms are compared to validate the item's purchase price and ascertain that the item being returned by the customer is in fact the item reflected in the sales receipt.

If the customer has the sales receipt and the receipt does not include the modified bar code dataform, the modified bar code dataform printed on the label 345 is scanned and decoded (shown at 540). The decoded values are compared to the human readable characters printed on the sales receipt to validate the item purchase price, date of sale and item stock keeping unit number as set forth on the sales receipt (shown at 542).

If the decoded data values agree with the sales receipt value, the purchase price is determined 528 and refunded or credited to the customer 530. The inventory file is appropriately updated 532. In this case, the modified data code printed on the label is used to validate the human readable characters on the sales receipt and ascertain that the item being returned by the customer is in fact the item reflected in the sales receipt.

If the customer does not have the sales receipt, the modified bar code dataform printed on the label 345 is scanned and decoded (shown at 550). The purchase price to be refunded or credited to the customer is determined from the decoded data values 528. The purchase price is refunded or credited 530. Finally, the inventory file is appropriately updated 532.

In a similar vein, the use of a modified bar code dataform including sales transaction information may be advantageously employed by wholesalers and distributors to increase the efficiency and integrity of the returned/rejected goods process in their respective operations.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A method of providing a two dimensional bar code dataform for a product having a bar code dataform associated with the product, the steps of the method comprising:
    a) scanning the product's bar code dataform;
    b) decoding the dataform to generate decoded data related to the product;
    c) selecting data to comprise the two dimensional bar code, the selected data including at least a portion of the decoded data and additional data related to the product;
    d) encoding the selected data to produce the two dimensional bar code dataform; and
    e) printing the two dimensional bar code dataform on a label to be attached to the product.

2. The method of providing a two dimensional bar code dataform for a product as set forth in claim 1 wherein at least a portion of the additional data is retrieved from a database remote from a location of the product.

3. The method of providing a two dimensional bar code dataform for a product as set forth in claim 1 including the additional step of providing a visual representation of the selected data comprising the two dimensional bar code dataform prior to producing the two dimensional bar code dataform.

4. The method of providing a two dimensional bar code dataform for a product as set forth in claim 1 wherein the additional data includes data related to a sales transaction involving the product.

5. The method of providing a two dimensional bar code dataform for a product as set forth in claim 4 wherein the sales transaction data includes the sales price of the product in the sales transaction.

6. The method of providing a two dimensional bar code dataform for a product as set forth in claim 1 including the additional step of modifying the selected data and using the modified selected data to produce the two dimensional bar code dataform.

7. The method of providing a two dimensional bar code dataform for a product as set forth in claim 6 wherein the step of modifying the selected data includes using a mathematical formula to modify at least a portion of the selected data.

8. A method of generating a two dimensional bar code dataform for a product, the steps of the method comprising:
    a) scanning a first bar code dataform associated with the product;
    b) decoding the first bar code dataform to generate decoded data related to the product;
    c) storing the decoded data in a memory;
    d) selecting data to be included in the two dimensional bar code dataform including decoded data stored in the memory and additional data related to the product;
    e) retrieving the selected decoded data from the memory;
    f) obtaining the selected additional data;
    g) generating the two dimensional bar code dataform based on the selected data; and
    h) printing the two dimensional bar code dataform on a label for association with the product.

9. The method of generating a two dimensional bar code dataform for a product as set forth in claim 8 wherein the selected additional data is stored Ina database remote from a location of the product and the step of obtaining the selected additional data includes retrieving the selected additional data from the database.

10. The method of generating a two dimensional bar code dataform for a product as set forth in claim 8 wherein the selected additional data includes a sales price of the product.

11. A method of generating a two dimensional bar code dataform label for a product using a scanning and labeling device, the two dimensional bar code dataform label incorporating decoded product-related data from a bar code dataform associated with the product and data relating to a sales transaction involving the product, the steps of the method comprising:
    a) scanning the product's bar code dataform label with the scanning and labeling device;
    b) decoding the scanned bar code dataform and storing at least a portion of the decoded data related to the product in a memory of the scanning and labeling device;
    c) selecting data for the two dimensional bar code including at least some of the decoded data and the sales transaction data;
    d) inputting sales transaction data specified in the selected data into the memory;
    e) retrieving the selected data from the memory;
    f) generating the two dimensional bar code dataform based on the retrieved data; and
    g) printing the two dimensional bar code on a label.

12. The method of generating a two dimensional bar code dataform label for a product using a scanning and labeling device as set forth in claim 11 wherein at least some of the sales transaction data is input to the device memory front a point of sale terminal.

13. The method of generating a two dimensional bar code dataform label for a product using a scanning and labeling device as set forth in claim 11 wherein the sales transaction data is input to the device memory from a remote database.

14. A bar code scanning and labeling apparatus for generating a two dimensional bar code dataform for a product incorporating selected data, the selected data including decoded product-related data from a bar code of the product scanned and decoded by the apparatus and additional data related to the product, the apparatus comprising:

a) a microprocessor including data selection circuitry adapted to retrieve the selected data from a data storage means of the apparatus and to assemble the retrieved selected data into a format suitable for encoding by encoding/decoding circuitry into the two dimensional bar code;

b) a scan engine electrically coupled to the microprocessor and, upon actuation, adapted to scan the bar code dataform;

c) the encoding/decoding circuitry electrically coupled to the microprocessor and including:
  i) decoding circuitry for decoding the scanned bar code dataform into machine readable decoded data representing the scanned bar code; and
  ii) encoding circuitry for generating the two dimensional bar code dataform by encoding the selected data including the additional data;

d) interface means coupled to the microprocessor or actuating the scan engine and for specifying the selected data;

e) communication means electrically coupled to the microprocessor for transmitting data to and receiving data from a remote device at least a portion of the additional data being data received from the remote device;

f) the data storage means electrically coupled to the microprocessor for storing the decoded data from the scanned bar code and data received from the remote device; and g) printing means for printing the two dimensional bar code dataform on a label.

15. The bar code scanning and labeling apparatus of claim 14 wherein the printing means includes structure coupled to the housing for supporting a roll of pressure sensitive labels releasably adhered to a carrier web.

16. The bar code scanning and labeling apparatus of claim 14 wherein the communication means includes a transceiver for transmitting data to and from the remote device via RF data signals.

17. The bar code scanning and labeling apparatus of claim 14 wherein the apparatus includes a display means for displaying human recognizable data representing the decoded data from the scanned bar code dataform and the selected data.

18. The bar code scanning and labeling apparatus of claim 17 wherein the interface means includes circuitry for confirming the displayed selected data prior generation of the two dimensional bar code dataform.

19. The bar code scanning and labeling apparatus of claim 14 wherein the scanning means is adapted to scan a one dimensional and a two dimensional bar code dataform.

20. The bar code scanning and labeling apparatus as set forth in claim 14 wherein the microprocessor data selection circuitry retrieves selected data which is stored in the data storage means and utilizes the communications means to retrieve selected data stored in or accessible through the remote device.

21. The bar code scanning and labeling apparatus set forth in claim 14 wherein the microprocessor includes processing means responsive to commands input through the interface means for modifying at least a portion of the selected data and wherein the modified selected data is incorporated into the two dimensional bar code dataform.

22. The bar code scanning and labeling apparatus set forth in claim 14 wherein the interface means comprises a keypad.

23. The bar code scanning and labeling apparatus set forth in claim 14 wherein the interface means comprises an application program.

24. A method of providing a two dimensional bar code dataform for an item having a first bar code dataform associated with it, the steps of the method comprising:

a) scanning the dataform associated with the item;

b) decoding the scanned dataform to generate decoded data related to the item;

c) selecting data to comprise the two dimensional bar code, the selected data including at least a portion of the decoded data and additional data related to the item;

d) encoding the selected data to produce the two dimensional bar code dataform; and e) imprinting the two dimensional bar code dataform on a label adapted to be attached to the item.

25. The method of providing a two dimensional bar code dataform for an item as set forth in claim 24, wherein at least a portion of the additional data is retrieved from a database at a location remote from the item.

26. The method of providing a two dimensional bar code dataform for an item as set forth in claim 24 wherein the additional data includes data representative of processing modifications made to the item.

* * * * *